(12) United States Patent
Shafer

(10) Patent No.: US 7,856,367 B2
(45) Date of Patent: Dec. 21, 2010

(54) WORKERS COMPENSATION MANAGEMENT AND QUALITY CONTROL

(76) Inventor: Rebecca Shafer, 45 Echo Rd., Mansfield Center, CT (US) 06250

( * ) Notice: Subject to any disclaimer, the term of this patent is extended or adjusted under 35 U.S.C. 154(b) by 103 days.

(21) Appl. No.: 11/839,483

(22) Filed: Aug. 15, 2007

(65) Prior Publication Data

US 2008/0046297 A1 Feb. 21, 2008

Related U.S. Application Data

(60) Provisional application No. 60/837,586, filed on Aug. 15, 2006.

(51) Int. Cl.
*G06Q 40/00* (2006.01)
(52) U.S. Cl. .............................. 705/4; 705/7; 705/36 R; 705/35
(58) Field of Classification Search .................. 705/7, 705/1, 36 R, 35, 4
See application file for complete search history.

(56) References Cited

U.S. PATENT DOCUMENTS

2001/0044735 A1* 11/2001 Colburn et al. ................. 705/4
2008/0154672 A1* 6/2008 Skedsvold ..................... 705/7

OTHER PUBLICATIONS

Ellen Barre Spiegel and Bill Speigel, Weighing the value of cost containment in a workers comp plan, Jan. 2007, American Agent & Broker, v79n1, pp. 34-39.*

* cited by examiner

*Primary Examiner*—Behrang Badii
(74) *Attorney, Agent, or Firm*—Miles & Associates, P.C.; Timothy F. Mills

(57) ABSTRACT

A system and method, via an internet website, has been developed for the efficient implementation of workers' compensation cost containment practices, more particularly relating to indemnity (lost wages) and medical costs of workers' compensation claims. The site analyzes information about the user's current workers' compensation injury handling practices and provides quantified results and customized recommendations. The system provides the tools necessary to implement the recommendations suggested.

6 Claims, 13 Drawing Sheets

Fig. 9

Level 3: Improvement Plan

Step-by-Step Overview
- Timetable

☐ 1. Performance Goals
- Email Requesting Data Correction
- Manager's Self Audit Questionaire
- Lost Work Day Log
- Worst to Best List
- Cost Per FTE Works ☑ 2. Post Injury Response Procedures
- Work Ability Form
- Transitional Assignment Form - Spanish
- Injury Procedure Worksheet
- Post Injury Interview with Employee
- Supervisor Report of Incident
- Employee Report of Incident ☑ 3. Communication
- Employee Brochure
- Guideline for Managing Ongoing Claims
- Introduction Letter to Employee
- Weekly Meeting Guidelines
- Claims Communication Diary ☑ 4. Return to Work Programs & Transitional Duty
- Transitional Assignment Form
- Disability Guidelines
- Sample Transitional Duty Policy
- Letter to Employee Requesting WAF ☐ 5. Management Commitment
- 30 Minute Management Presentation
- Facilitator's Script
- General Managers Best Practices
- Management Kick Off Letter ☐ 6. Insurance Co. & Claims Administrator Performance
- Letter Requesting SHF's
- Account Instruction Checklist ☐ 7. Medical Care Coordination
- Physician Telephone Questionnaire
- Medical Provider Brochure ☑ 8. Medical Cost Containment
- Letter Requesting NCM Update ☑ 9. Fraud, Abuse & Malingering
- Letter Requesting Investigation
- Letter to Employee's Doctor ☑ 10. Training Initiatives
- Post Injury Procedure Stacked Steps
- Powerpoint Presentation to Supervisors
- Wallet Card
- Wallet Card - Spanish
- Supervisor's Guide - Spanish
- Supervisor's Guide
- Wallet Card (English / Spanish)
- Supervisor's Best Practices
- Supervisor's Best Practices Worksheet Do you need Spanish translations?

Workers' Compensation Injury Management Tool Kit™

Admin | My Profile | LOG OUT

HOME | ABOUT US | WORKERS' COMP 101 | SUCCESS STORIES | NEWS & ARTICLES | OUR PARTNERS | LIVE HELP

You are logged in as Becki Shafer — Becki's Page

LEVEL 2

Sample Company - 2005

DATA BENCHMARKING

1. Benchmarking
2. Benchmarking Results
3. Return To Work

| | BENCHMARK | | RESULTS | NATIONAL AVERAGE |
|---|---|---|---|---|
| 1 | Average Cost per Workers' Compensation Claim | 301 | $5,319 | $5,541 [1] |
| 2 | Average Indemnity Cost per Lost Time Claim | 302 | $5,481 | $6,649 [2] |
| 3 | Average Medical Cost per Lost Time Claim | 303 | $5,987 | $7,070 [2] |
| 4 | Average Expense Cost per Lost Time Claim | 304 | $1,150 | |
| 5 | Average Cost per Lost Time Claim | 305 | $12,618 | $13,719 [2] |
| 6 | Average Cost per Medical Only Claim | 306 | $679 | $478 [1] |
| 7 | Percentage Lost Time Claims to Total | 308 | 38.86% | |
| 8 | Average Losses as a % of Payroll | 312 | 1.86% | 2.2% [3] |
| 9 | Average Losses as a % of Revenue | 316 | 1.02% | 1.95% [4] |
| 10 | Recordable Rate | 320 | 9.69 | |
| 11 | Lost Work Day Rate | 324 | 63.12 | |
| 12 | Average Losses per Full Time Equivalent Employee (FTE) | 328 | $515 | $885 [5] |
| 13 | Sales Required to Pay for Losses | 332 | $123,669,573 | |
| 14 | Projected Savings for Improvement to National Average | 336 | $0 | $885 [5] |
| 15 | Projected Savings for Improvement to FTE Goal | 340 | $2,878,938 | $300 |

1. NCCI 2002 Annual Statistical Bulletin • 2. NCCI 2000-2001 DCI @ 18 Months • 3. A.M. Best 2003
4. 2004 RIMS Benchmark Survey • 5. 2004 RIMS Benchmark Survey Save & Move On | Add New Benchmark | Save & Logout

Fig. 11

Workers' Compensation Injury Management Tool Kit™

Admin | My Profile | LOG OUT

HOME | ABOUT US | WORKERS' COMP 101 | SUCCESS STORIES | NEWS & ARTICLES | OUR PARTNERS | LIVE HELP

You are logged in as Becki Shafer

Becki's Page

LEVEL 3
STEPS TO COMPLETING YOUR PROGRAM

- Step-by-Step Overview
1. Performance Goals
2. Post Injury Response Procedures
3. Communication
4. Return to Work Programs & Transitional Duty
5. Management Commitment
6. Insurance Co. & Claims Administrator Performance
7. Medical Care Coordination
8. Medical Cost Containment
9. Fraud, Abuse & Malingering
10. Training Initiatives Do you need Spanish translations?

Training Your Supervisors
BRINGING SUPERVISORS ON BOARD

THE SUPERVISORS

A great deal of thought should go into training the supervisors so they are well-informed, prepared for the most common obstacles, and can effectively participate in a way that cultivates a positive employer - employee relationship.

A supervisor may have conflicting roles -- being a friend of the employee, yet responsible to management for a thorough investigation and injury prevention. It's important to properly explain the program up front so the supervisors can answer questions the employees have. For questions they can not answer, they should know who to refer the employees to for additional assistance.

Familiarize supervisors with "Best Practices." Customize the Best Practices. The supervisors should be active participants in this. This is important because your training will be designed around what you want your supervisors to do. Training isn't just about procedures, it's about the right attitude and effective communication also.

To design training, determine objectives of training by asking, "What do I want my supervisors to do differently after the training?" Your response to this question will be the objective of the supervisors training program.

Draft supervisor best practices on the Supervisor Best Practice Worksheet.

[ Supervisor's Best Practices ]

[ Supervisor's Best Practices Worksheet ]

During supervisor training, teach the supervisors the new post injury process for your company. The "Stacked Steps" format is one we have found very effective.

Consider WHERE the communication piece will be used and how it will be used. Adapt the format of the Stacked Steps for your workplace. For example, employees at one site may use brochures, for traveling employees a wallet card may be best. For call center employees, a small laminated card or booklet may work well.

[ Post Injury Procedure Stacked Steps ]

Because the program is new, you want to bring the supervisor on board as quickly as possible and to gain his/her support for the program.

NOTE: COMMUNICATION IS KEY!
ASK FOR THEIR COOPERATION IN ROLLING OUT THE NEW PROCESS.

The supervisor must be involved because:

- They have daily interaction with the employees
- The supervisors are authority figures and leaders in the day-to-day operations of your facility.
- The supervisor is the first person to know that one of the employees has been injured and sets the tone for rapid treatment and return to work.
- The supervisor will make sure injured employees are transported to the medical facility and have proper documentation, thus, they must know where to get the correct forms and how to fill out them out.
- The supervisor may be the person conducting the accident investigation

Fig. 12

WORKERS COMPENSATION MANAGEMENT AND QUALITY CONTROL

CROSS-REFERENCE TO RELATED APPLICATION

Claims priority from U.S. Provisional Patent Application No. 60/837,586 filed Aug. 15, 2006.

STATEMENT REGARDING FEDERALLY FUNDED SPONSORED RESEARCH OR DEVELOPMENT

Not applicable.

BACKGROUND OF THE INVENTION

1. Field of the Invention

Each year companies pay millions of dollars in avoidable Workers' Compensation costs and lost employee productivity due to lack of information, lack of standardized processes to analyze and manage the losses, absence of transitional duty programs to return workers to productive positions, unrecognized fraudulent claims, the amount of time required to implement and train company staff to manage the myriad elements of a successful cost reduction program, etc. Most companies' Workers' Compensation costs can be reduced by 20%-50% with the implementation of an efficient and effective Workers' Compensation Program. Yet most companies do not have the knowledge and resources to do so, and hiring consultants to review and train staff is very expensive. The method and system of the present invention provides an online centralized source to implement, analyze and manage a workers compensation program by any employer. In addition, the method provides scalability of resources thus enabling even small employers to implement a program by selecting control elements of the method through the online centralized source.

Never before has there been a comprehensive computer based online Workers' Compensation Cost Containment Program like the system provided in the present invention and implemented in a preferred embodiment at the website, www.WorkersCompKit.com. This new method provides users the necessary tools to self implement and manage a workers' compensation cost containment program, or have a third party manage the program, as is common in the industry. An advantage of the present invention is that if a third party administrates the company's workers compensation program, the company workers compensation program manager can use the centralized web enabled processes of the present invention to monitor and manage the effectiveness of the third party administrator, which thus provides quality control by the company never before possible.

To ensure successful implementation the website provides a centralized location for all users to access workers' compensation program background information, assessment tools, benchmarks, customized recommendations, a step-by-step improvement plan, and the necessary training tools for the user. In the past, websites have provided information about workers' compensation, however, it was related to safety or state laws and regulations, not cost containment methodology. This is the first comprehensive online site that provides management methods for analysis and quality control from inception through implementation and training.

2. Description of Related Art

Various attempts have been made to develop ways to deliver workers compensation management services. A common method still in extensive use is to have a consultant travel to the employer and spend many days observing employment practices, taking and recording notes, and then returning to the office to compile those notes into a massive report. The report would then go back and forth for revisions until the assessment report was perfect. This process would take approximately nine to twelve months just to get to implementation with the project often stalling at the assessment phase with the threat of actual implementation being weakened because the project had lost momentum or run out of money or business decision changed the focus because so much time had elapsed. Too much time was spent on assessment taking the focus off the real purpose which was to identify strengths and weaknesses in the program and build an action plan to create a strong injury management implementation program. Instead, the focus was on providing the client with a perfect report.

Www.empaq.org is a member focused initiative established by the Council on Employee Health and Productivity (CEHP) for program evaluation with the goal of measuring and enhancing organizational health. EMPAQ® provides standardized metrics and program assessment tools that assist employers and their suppliers in the management of health and productivity management programs for four main benefit program types—workers' compensation, short and long-term disability and family medical leave. However, this website differs from the method of the present invention in that Empaq does not assess and quantify work place practices (it only measures data), and does not offer management solutions to improve the program.

The software application described at www.comperaser.com is a claims management software application focusing on pre-loss (safety) training and claims management. In comparison to the method of the present invention it does not contain the Best Practice Assessment nor Scoring summaries. Similarly, the referenced patent application Uninsured Coast Estimation System and Method, Pub. No. 2007/0021985, is limited to a processing system for measuring uninsured costs.

The Institute of Workers Compensation Advisors, whose website url is as follows, www.workcompprofessionals.com, trains and certifies professional insurance agents to help companies identify and fight overcharges caused by mistakes rampant in the complex and confusing Workers' Compensation system. It does not provide the processes of the present invention.

Comperaser and the Institute of Workers Compensation Advisors are trying to lower workers comp costs but these programs do not contain an automated, standardized assessment scoring system based on best practices. Neither do they contain complete on-line training programs nor easy to use benchmarking systems of the present invention into which an employer can input simple data and quickly develop an easy-to-read online quantitative report comparing the company to national averages. This invention allows management to make quick, correct decisions based on quantifiable indices presented as a score. This allows a large multi-site employer to assess workers compensation performance in many locations simultaneously for review by senior management. This can take place within a few minutes compared to weeks and months using the standard method in the industry of hiring a consultant for onsite reviews and training.

BRIEF SUMMARY OF THE INVENTION

The method of the present invention overcomes the limitations of the related art by shortening the length of time from assessment to implementation, standardizing assessment criteria for better data analysis, automating the assessment process for quicker turn around from assessment to implementation by using a web based centralized program source that provides companies an online immediate assessment to implement a standardized workers comp cost control program.

Before the development of the present invention, it was not possible to gather the information, develop recommendations and provide education and tools to implement a workers compensation cost containment program in a matter of minutes or hours, versus the former matter of weeks to months. When an assessment was written it took much longer, and did not gather consistent information because it was done by widely dispersed consulting staff. It has become increasingly difficult for the workers compensation program administrator to maintain quality control by determining and guaranteeing that developed standards are followed and changes implemented.

A system and method is disclosed, via a computer based website, for the efficient implementation and management of workers' compensation cost containment practices relating to reducing indemnity (lost wages), medical costs of workers' compensation claims, the overall expense of the program, and assessing staff practices to maintain quality control of the program. The method of the present invention analyzes a plurality of elements comprising a successful workers compensation management program including but not limited to information about the user's current workers' compensation injury handling practices, including return to work at full-duty and transitional duty programs, communications with employees and physicians, steps taken to reduce fraud, increase management involvement and commitment, and many other elements, to provide recommendation for improvement, statistical benchmarks, program efficiency scores, and training. In the assessment process, the users responds to a series of questions which are analyzed in real time by the proprietary application of the present invention and a list of customized recommendations is provided to each user. Loss data and corporate data is input by users to determine how the company compares to national statistics, commonly referred to in the trade and herein as benchmarks. Dates of employee injuries and dates of return to work are input to measure the efficiency of the companies return to work program. The system of the present invention provides the tools necessary to implement the recommendations suggested, including sample documents, forms, presentations, scripts, and the necessary training tools.

Once the recommendations for improvement are provided the system of the present invention enables the user to walk through a step-by-step improvement plan that includes everything from setting performance goals to managing medical care coordination, cost containment, and finally, training users and supervisors. The system provides users with the necessary educational information, and also the tools to use that knowledge to implement a successful workers' compensation cost containment program. The goals of this system are not only to reduce costs, but also to strengthen relationships between companies and their employees and return them to the substantial gainful activity of work and employment.

In addition, the system of the present invention provides online the training initiatives necessary for successful implementation. While all aspects of a cost containment program are important, without the correct training tools it is difficult to effectively reduce workers' compensation costs. The online resources offer a plurality of tools to ensure successful training, such as presentations, sample scripts, exercises, demonstrations, and handouts which can be customized for each user or company.

The method of the present invention substantially departs from the conventional concepts of the related art by providing automated assessment and program recommendations, which substantially shortens program life cycles. The results are immediately quantifiable which has huge ramifications for conducting data analysis and reporting results on any number of measurement schema (inter/intra-national, multidivisional, industry type, geographic region, etc.). It is how the assessment is conducted and the recommendations generated that is a significant departure from the prior art.

A further advantage of the method of the present invention is an automated injury management program that is employer driven. Because the assessment is web-based and completely automated this is a great departure from the traditional and conventional way of assessing workers comp issues in a company.

A further advantage of the method of the present invention is that assessment results are quantifiable.

A further advantage of the method of the present invention is that automation sustains focus throughout assessment to recommendation and into implementation. Automation also holds measurements constant so that evaluations are uniform across the board. Thus a company having multiple divisions can assure that evaluations are consistent. Everyone is being evaluated on the same criteria which can unearth patterns, trends, variations, and other differences among divisions.

A further advantage of the method of the present invention is that money is better spent on implementation. The method of the present invention changes the direction and apportionment of program costs. Instead of investing heavily in assessment and recommendation, users can complete these steps inexpensively and save money for the crucial part of injury management, implementation of recommendations, which is where the money should be spent.

A further advantage of the method of the present invention is that since participants tend to lose focus when a process is stretched over a long period of time, as with the current methods described in the prior art, shortening the process by the method of the present invention sustains focus and intent to implementation. Shortened assessment recommendation time frames sustains user focus in implementation, and shortened time frames sustain project momentum onto and through completion.

A further advantage of the method of the present invention is that based on the workers comp score, users can gauge how well or how poorly they are doing, and will already have an idea of their strengths and weaknesses. Before end-of-business day users can have the nucleus of an implementation plan they can use going forward. They can identify areas of strength and weaknesses and method recommendations will provide basis for action plan.

A further advantage of the method of the present invention is that before the method of the present invention, only the largest companies could avail themselves of an injury management improvement program because everything was paper based and consultants were needed to conduct the assessment and training. Whereas with the method of the present invention it is employer driven. An employer, such as the workers compensation program manger, not just the insurance company managing the claim process, can take this assessment and know the state of the program and where improvements need to be made.

A further advantage of the method of the present invention is that even small companies that cannot afford a consultant can avail themselves of a self-implementing workers compensation cost control program including virtually any employer who wants to use this service.

A further advantage of the method of the present invention is that the methodology is quantifiable. Before, assessments could only be couched in terms of words, now users can get a workers' comp score that quantifies their performance in preferably the ten key drivers that control workers compensation costs. Quantifying assessment data has huge ramifications for discerning economic, or geographical trends or detecting trends in specific types of businesses (i.e., manufacturing, service industries. Quantifying assessment data also enables users to forecast the depth and breadth of their injury management project. The higher the score, the smaller the implementation will be, the lower the score the more implementation areas need to be built.

A further advantage of the method of the present invention is the adaptability for multi divisional companies. In the past, assessing workers compensation practices for multidivisional companies was an almost Herculean task, and assessment alone could take years. And even then it may not present a complete picture as assessment criteria might differ or owners might opt not to assess every facility due to the time and cost involved. The method of the present invention enables employers to have every division participate in the same assessment for a significantly lesser cost than before, measuring the same criteria. Automation of the analysis provides results rapidly which provides a great advantage for conducting a comprehensive assessment of global proportions, and doing so with relative ease. Thus the online system enables designated managers to view subordinate divisions and determine areas for improvement at a glance. The fact that every user takes the same assessment and the answers are standardized ensures that this measurement is a universal yardstick, or score, upon which the key cost drivers can be measured from company to company or division to division. Thus the score ensures that every participant is being measured on consistent rather than arbitrary criteria.

A further advantage of the method of the present invention is providing the entire educational content of the improvement plan modules and the tools are available to implement them on-line. Thus it enables a large multi-site employer (or a small one-site employer) to roll out a consistent cost containment program across the country within a few days or weeks, rather than months.

In yet another aspect of the invention, if a client that has their own set of unique workers compensation performance standards to be used in their assessments and benchmarking, the client may have a custom database compiled and made available to its users via the method of the present invention. Each internet application web menu may be created and customized specifically for the client. The client will then direct each of its employees, as well as its independent contractors or consultants, to the one location on the internet where the program standards can be obtained and used to manage the program. The application provides an internet based set of tools and menus that advance and enhance the environment for the specific needs of the client and are instantly available to anyone around the globe with an internet connection.

BRIEF DESCRIPTION OF THE DRAWINGS

Figure 9:
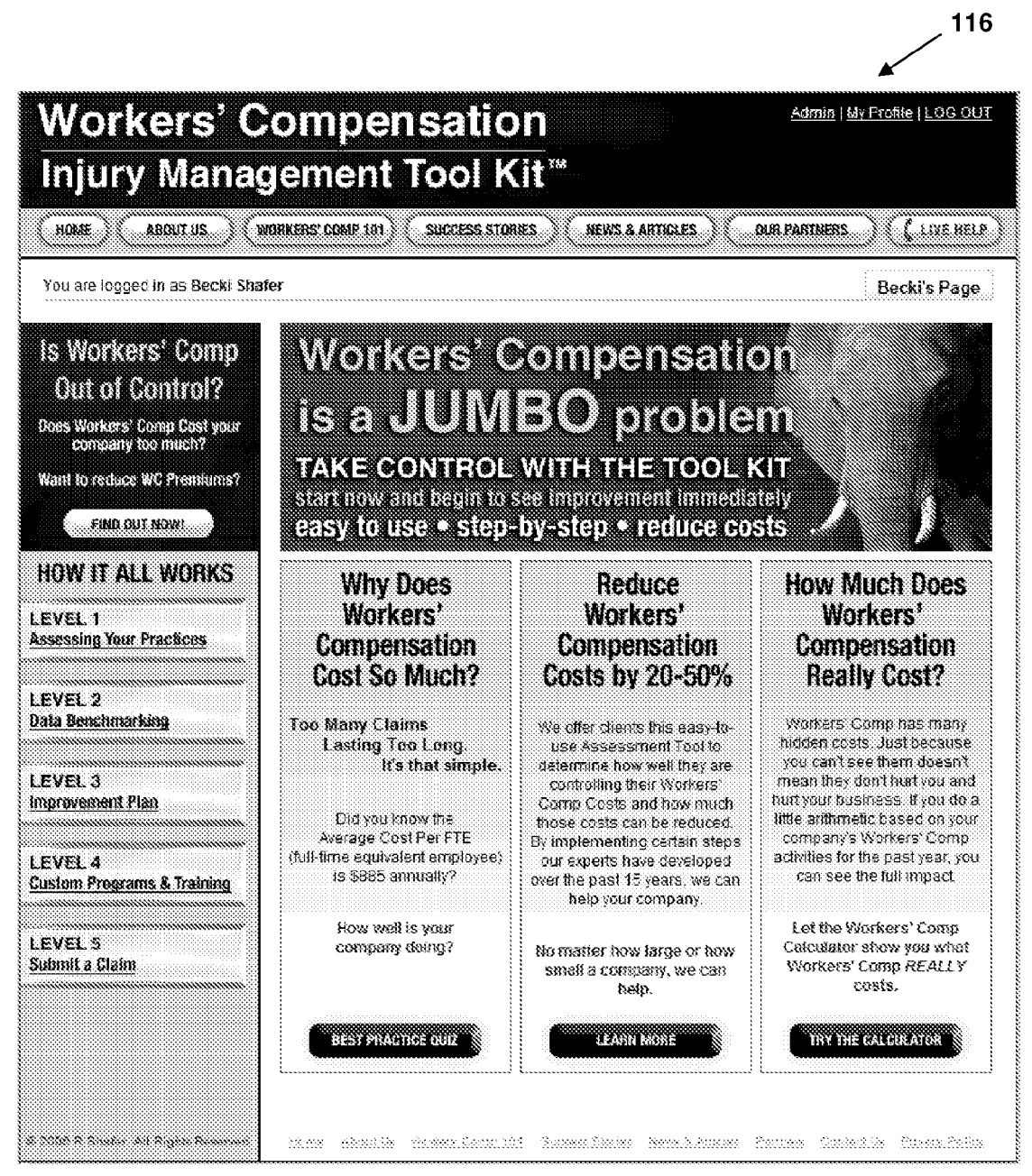

FIG. 9 is a screenshot of a computer user interface showing an embodiment of the web portal of the present invention;

FIGS. 10A and 10B are screenshots of a computer user interface showing an embodiment of the dashboard of the present invention;

FIG. 11 is a screenshot of a computer user interface showing an embodiment of the quantified results of the data benchmarking process of the present invention;

FIG. 12 is a screenshot of a computer user interface showing an embodiment of the improvement training process of the present invention;

DETAILED DESCRIPTION OF THE INVENTION

The present invention is described more fully by reference to the preferred embodiments of the figures. However, the embodiments of the invention may be in different forms and these drawings should not be construed as limiting the scope of the invention as described herein. FIGS. 1 through 12 are illustrious of embodiments of the present invention and are in accord therewith.

The method of the present invention substantially departs from the convention methods of workers compensation program management and quality control by providing single source, up-to-date comparative standards and statistics (FIG. 12) integrated into a complete workers compensation program management system that is self-implemented via a proprietary network computer user interface application accessible from any network enabled workstation. In a preferred embodiment of the present invention, applicable employer and employee data are input and converted into an accessible digital form, stored, analyzed and compiled according to a plurality of specific management parameters, displayed on the dashboard and/or printed to inform the user and to provide actionable recommendations for program changes and improvements. The method of the present invention overcomes the limitations of the related art in that the necessary data needed to manage a workers compensation program, identify problems and formulate solutions is centrally controlled and accessible at one source via a network connection and may be automatically updated through command functions of the network application of the invention.

In a preferred embodiment, the method of the present invention is initiated by navigating to a website url, www.WorkersCompKit.com, which retrieves an introductory proprietary webpage (FIG. 9) located on a remote network server or other computer. Information on workers compensation cost control is provided on the introductory page, and authorized users may proceed on to the dashboard (FIGS. 10A and 10B), or user interface, that comprises the links to the various process of the present invention. The dashboard is a page specific to that authorized user and can be accessed at anytime. The dashboard acts as a way to monitor progress throughout the implementation of the program. Each step is indicated on the dashboard. Once a step (or part of a step) has been completed it will be indicated with a symbol on the dashboard, preferably a checkmark. The user can then easily glance to see what steps have been completed. In addition, all documents that have been viewed or printed are listed under their related topic. This provides and easy-to-use document finder and central program data repository.

Figure 1:
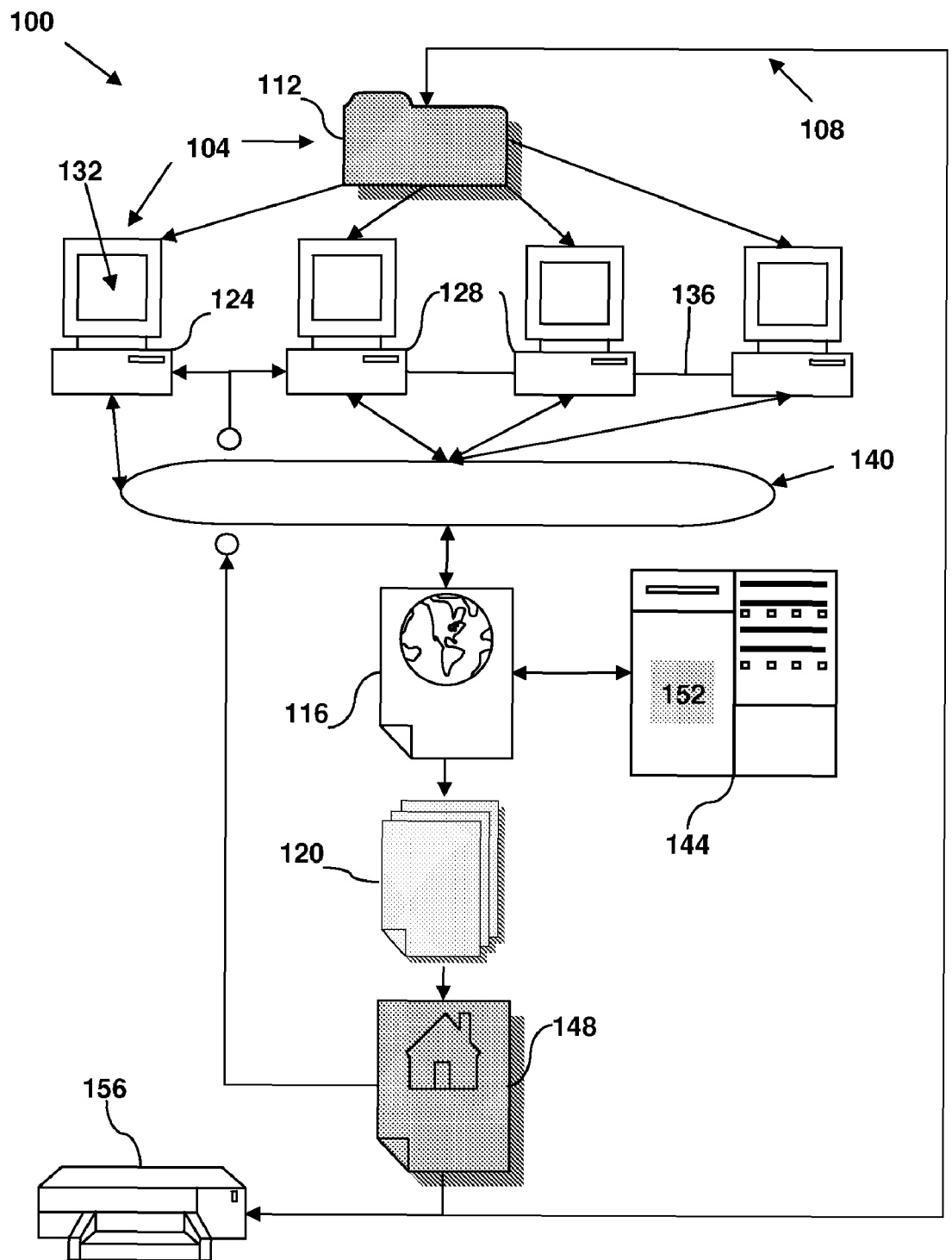
FIG. 1 is a schematic diagram of an exemplary environment in which the method of the invention analyzes and displays workers compensation program variables to effect program management and quality control.

Referring now to the method of the present invention, FIG. 1 is a schematic diagram of an exemplary environment in which the method of a preferred embodiment of the invention 100 may be used to input, process, analyze, quantify, store, retrieve and display the compiled workers compensation program data 152. A workers compensation cost analysis and management cycle 108 of the present invention is initiated by a user 104 logging onto a computer workstation 124, or a plurality of intranet connected computer workstations 128 for a plurality of users 104, running network accessing software 132. Through the network access software 132, by utilizing an optional username and password if required by the workers compensation program administrator, the user 104 accesses a proprietary workers compensation data entry and analysis software application 116 hereinafter known as the 'portal', resident on a remote server or other computer 144. If a user is not authorized they have the ability to view certain general information 204 about Workers' Compensation.

The user 104 then accesses a proprietary webpage on the portal 116, known as the 'dashboard' 120, to enter data from existing workers compensation injury claims, results from program management improvements and changes, program expenses, and any other relevant claim or program information 112. The dashboard 120 webpage provides access to a plurality of subordinate proprietary webpages specialized for a variety of data and management functions including, but not limited to, data input, analysis, reporting, production of recommendations, user training, etc. The computer workstations 124 and 128 may be interconnected via an intranet 136 or otherwise connected to a network 140, such as the internet, to access the portal 116 and dashboard 120 resident on the remote server 144. Upon input of the relevant data 112 through the dashboard 120, an analysis 148 by the portal application 116 compiled on the remote server 144 is provided to the user 104 directly on the workstation, 124 and/or 128. A printer 156 may also be utilized to display and distribute analyses 148, or any other printable materials from the portal 116 website in hard copy format. The input and analyzed data 152 is stored on the remote server 144 for access by an authorized user 104 from any workstation 124 and/or 128 without the requirement of any proprietary software being resident on the workstations 124 and/or 128. The data 152 may be extracted, compiled for various analyses, and the results of the analyses presented on the dashboard 120 in support of a plurality of purposes, including but not limited to assessment of workers compensation claim management practices, data benchmarking of economics of the workers compensation program, return to work data, production of program improvement recommendations, implementation of program management quality controls, training of users and managers, identification of user activity, etc.

To complete a workers compensation cost analysis and management cycle 108, data derived from the implementation of improvements and recommendations 148 is input 112 at the beginning of the cycle 108 which generates a new analysis 148 from the new data compilation 152, showing changes, if any, in program parameters from the prior cycle 108. Time requirements, costs, amounts and rates of change in program parameters are a few of a plurality of variables used to monitor the quality and efficacy of program costs and operations. In addition, any new data, such as new injury claims 112, is also input at the beginning of the cycle 108 and the data is analyzed as before, generating a new analysis 148 and stored data compilation 152. Thus the cycle 108 may be repeated a plurality of times in furtherance of the goals of the program.

Figure 2:
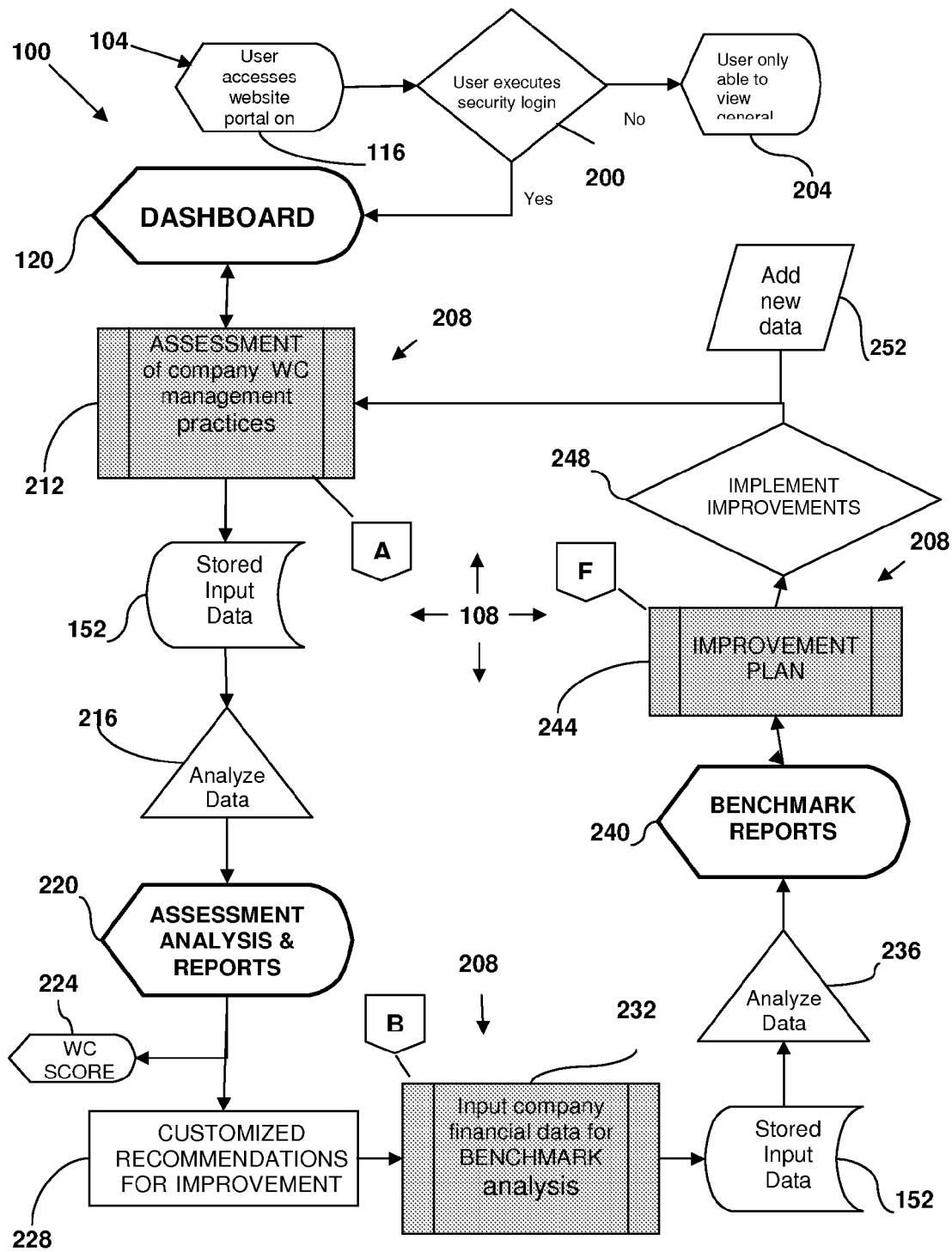
FIG. 2 is a flow diagram illustrating a preferred embodiment of the method of the invention.

Referring now to the method of the present invention, FIG. 2 is a flow diagram of a preferred embodiment of the method of the present invention 100 illustrating the various data input and analysis steps in the workers compensation cost analysis and management cycle 108. The analysis is initiated by a user 104 utilizing network access software 132 on a workstation 124, or 128, to locate the url of the portal of the present invention 116 via a network 136 or 140. Upon entry through a login page 200 on the portal 116, the computer displays the dashboard 120 of the present invention. If the user 104 is not authorized to proceed to the dashboard 120 then they are directed to one or more general information webpages 204 and the user may not proceed with analysis of their program by the method 100. The dashboard 120 comprises a plurality of processes 208, or levels, that further comprise the workers compensation management and quality control system and method 100 of the present invention. The dashboard 120 directs the user 104 to input workers compensation program data 112 in response to programmed queries.

The first process 208 of the method of the present invention 100 is an assessment of program claim and management practices 212. The input data 112 is subjected to analysis 216 and presented to the user in various report formats 220 including but not limited to a workers compensation program score 224 and customized recommendations for improvements to program practices (CRI) 228. Input data 112, and any assessment analyses and reports 220, are centrally stored 152 on the remote server or other computer 144 for later retrieval as desired by a user 104.

The next process in the cycle 208 is analysis of the economics of the workers compensation program. Costs and expenses 112 are input for analysis by the benchmark process 232. The input financial data 112 is subjected to analysis 236 and presented to the user in a plurality of report formats 240. The benchmark analysis 236 and reports 240 include, but are not limited to, comparisons with national averages and statistics relevant to program management and quality control, and graphs of program variables. The benchmark reports 240 are utilized to determine strengths and weaknesses in program management and expense, and to provide a benchmark 232 for the next process in the cycle 108. Input data 112, and any benchmark analyses and reports 240, are centrally stored 152 on the remote server or other computer 144 for later retrieval as desired by a user 104.

The next process 208 in the cycle 108, enables the workers compensation program manager to utilize the online staff improvement training tools 244 to upgrade staff skills with the goal of obtaining new program objectives derived from the online assessment 212 and benchmark 232 processes. The improvement training process 244 comprises a plurality of training exercises, or modules, specific for certain types of specialized tasks in operation of a workers compensation program. Preferably the modules are used sequentially to build complete skill sets in the user. However, the flexibility of the method 100 enables users of any skill level, including advanced users, to utilize one or more of the modules in any order desired. Proper utilization of the training process 244 will identify potential program improvements 248. The workers compensation program manager may then implement one or more of these improvements 248 as part of the program management and quality control. Preferably, to complete the cycle 108 the data 112 from the implemented program improvements 248 is input in the dashboard 120 and analyzed through the assessment 212 and benchmark 232 processes. The results may be compared to initial analyses to track program improvements over time, and to identify deficient areas where additional online training 244 could be utilized. In addition, the method allows for continual input of new data 252 to be included for analysis.

Thus the method of the present invention provides a centralized online cyclical framework for workers compensation program management and quality control. As stated above, preferably a new user to the method 100 would enter the cycle 108 at the assessment process 212 and proceed sequentially through the cycle as shown in FIG. 2. However, employers generally have established workers' compensation programs, as mandated by law in many jurisdictions, managed by staff with varying degrees of skill sets specific to managing a workers compensation program. Thus, an employer may not have the need for their program management staff to expend the time or resources necessary to complete an entire management cycle 108. The flexibility of the method 100 enables a user to begin the cycle 108 at any process depending upon their needs and skill level. In addition, it provides the workers compensation program manager with a centralized online analysis and training method 100 available at any time, without the need for hiring and scheduling a consultant to conduct expensive in-house training sessions. The program cost reduction by the method the present invention is in the range of fifty to seventy percent.

It is important to initially assess the strengths and weaknesses of the user's company in terms of workers' compensation program management, injury prevention and remediation, and return to work efforts. To do so, various tools are utilized in the assessment process 212 including answering a detailed questionnaire available through the dashboard 120. An optional element of the assessment is to have a Medical Advisor (board-certified MD) and a Senior Claims Consultant review a plurality of files in person, preferably 20-30 files in several of the user's claim offices, to determine how well their claims are being handled, and then incorporate this data into the assessment. The system 100 then analyses the input and produces a workers' compensation score 224 for the user. This score is preferably in a range from 1-100. The score tells the user what they are doing wrong and what they are doing right and how to improve it. In addition to the score 224, the system reveals the percentage of users (a percentile ranking) in which the company or user scored higher than. Once a user receives their score 224, the system uses the input from the assessment questionnaire to determine a set of customized recommendations for improvement 228 specific to the user or company. The assessment can be completed by various organizational units or departments within a corporation for comparison and individualized recommendations per organizational unit or department. In addition, the assessment 212 can be accessed and edited at anytime. If edited, the system will re-calculate the score 224 and modify the list of recommendations 228 as necessary. For example, a large multi-division company had fourteen division managers perform the online assessment which took approximately one hour. Three other divisions were reviewed in-house by consultants which took six months for same assessment.

Figure 3:
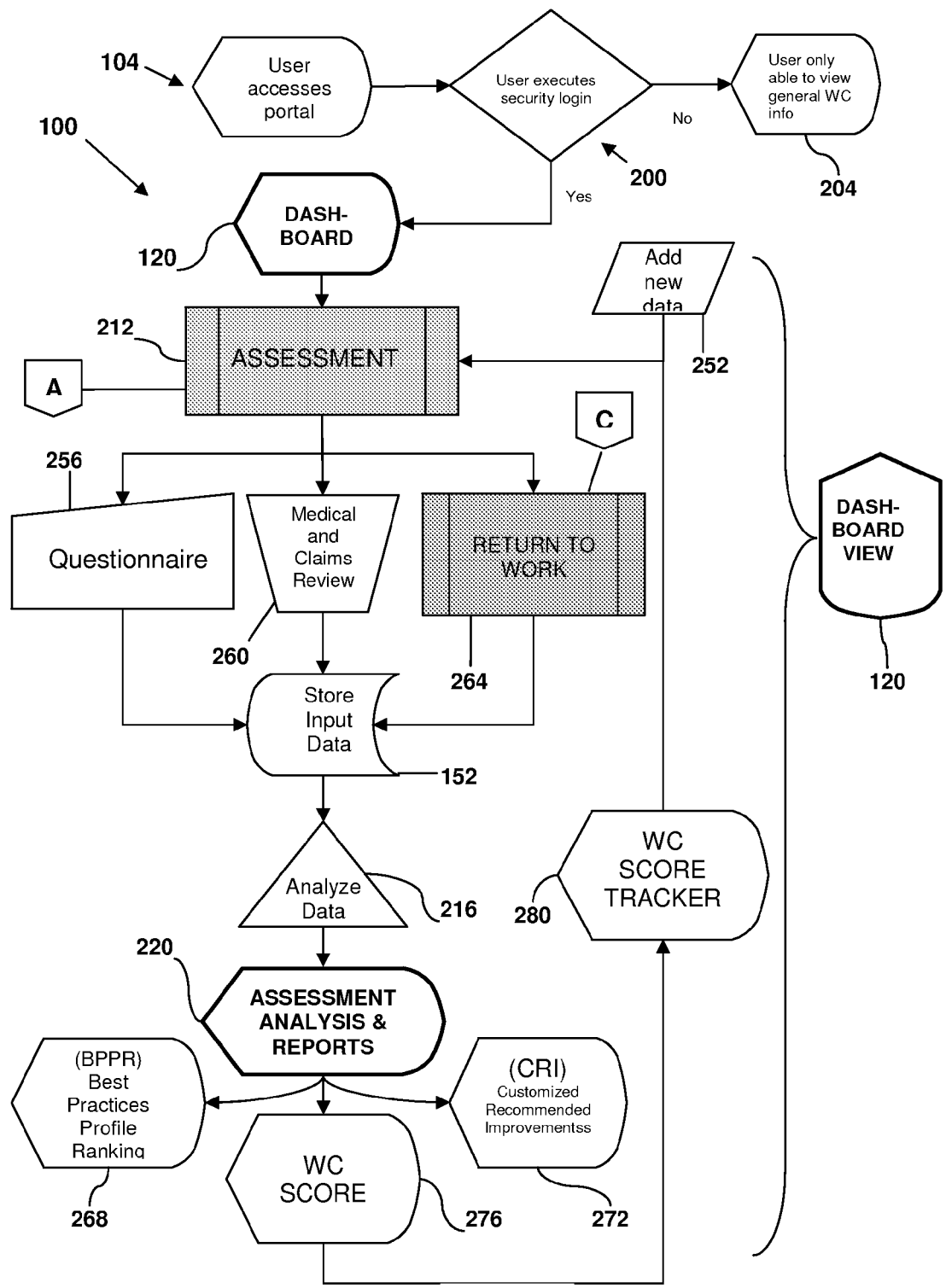
FIG. 3 is a flow diagram illustrating a preferred embodiment of the assessment process of the invention.

FIG. 3 is a flow diagram of the method of the present invention 100 showing a preferred method of the assessment 212. Upon accessing the dashboard 120 the user 104 is presented with a plurality of processes 208 as described above. The assessment 212 comprises a plurality of elements including but not limited to a workers compensation program questionnaire 256, in-house specialist medical and claims reviews 260, and review of injured employee return to work program 264. In an alternative embodiment, the return to work process 264 may be included in data benchmarking 232. The inputs from the questionnaire 256 and any specialist claim reviews 260 are stored 152 and analyzed 216 as previously described to provide the user 104 with relevant data compilations in reports 220 including but not limited to a best practices profile ranking 268, customized recommended improvements (CRI) 272, a workers compensation score 276, and a workers compensation score tracker 280. In addition, the return to work 264 analysis provides specific reports relevant to that function, as described in FIG. 5 below. An advantage of the assessment 212 is that new data 252 may be added at any time, or the process may be repeated as CRI 272, or other program improvements or changes are implemented. A further advantage of the assessment 212 is that the return to work analysis 264 may be utilized independently of the other processes 208 providing the user with enhanced flexibility of the method.

The next step in the preferred embodiment of the method 100 is the data benchmark process 232. Users input various company information into the system which is used to generate financial and performance benchmarks for the company. The company has the ability to enter various benchmarks for different years or organizational units. Input claims loss data is preferably the first type of data to be entered, and comprises loss data incurred for lost time claims, loss data incurred for medical claims, and loss data incurred for expenses, and the total incurred for loss claims. Preferably, the second type of data to be entered for the benchmark analysis is corporate data comprising total revenue, total payroll, total number of man hours and profit margin.

Once the financial and other relevant benchmark data is input by the user, the system analyzes the information to produce a benchmark report which calculates a plurality of measurements and compares the measurements to national averages and statistics. Sources of National Benchmarks: Workers Comp Research Institute (WCRI) Data, Risk and Insurance Management Society (RIMS) 2007 Benchmarking Survey, National Council on Compensation Insurance (NCCI) 2002 Annual Statistical Survey. This allows the user to clearly see where the company stands in relation to national averages in areas pertaining to workers' compensation. Preferably the report measurements include, but are not limited to, average costs, percentage lost time to total, losses as percentage of payroll, losses as percentage of revenue, recordable rate, lost work day rate, cost per full time equivalent employee, sales to pay for accidents, projected savings for improvement to national average, and projected savings for improvement to company goal. As mentioned above, the user has the ability to enter a plurality of benchmarks. The most common use of this functionality is to enter various years or organizational units/departments for comparison reasons. If the user would like to enter another benchmark they can do so by clicking the 'add new benchmark' button in FIG. 10A and repeat the steps.

Figure 4:
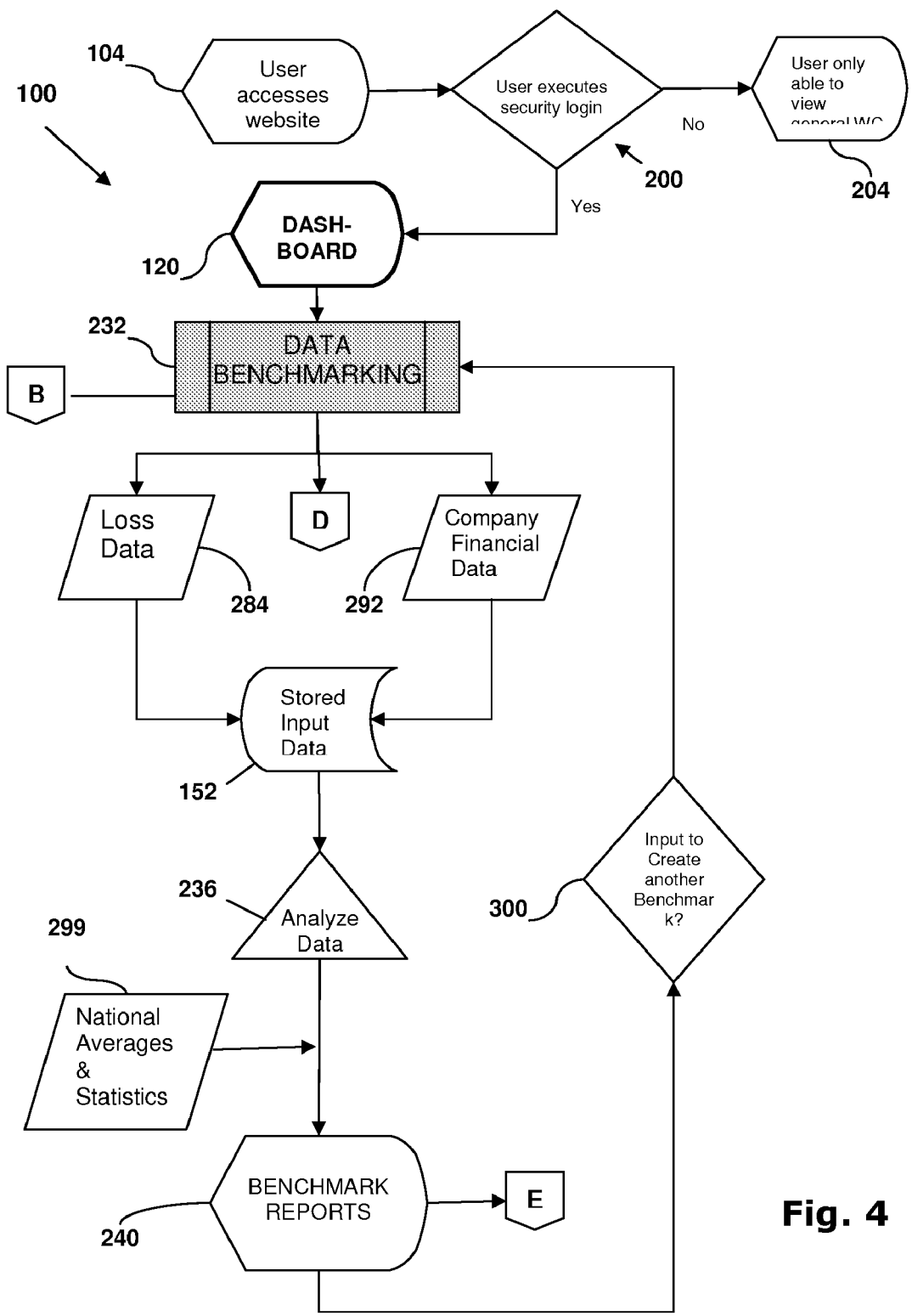
FIG. 4 is a flow diagram illustrating a preferred embodiment of the data benchmarking process of the invention.
Figure 7:
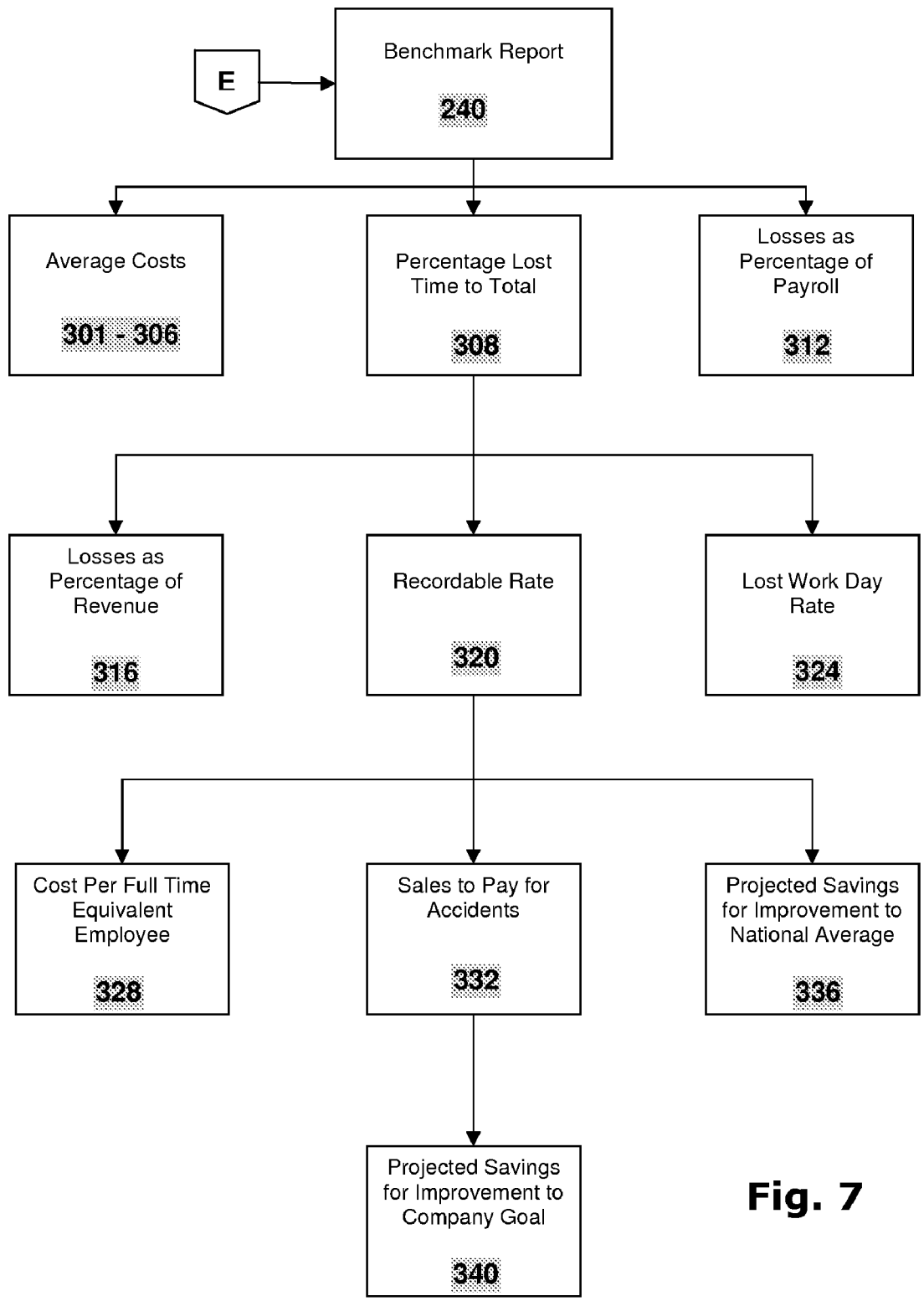
FIG. 7 is a flow diagram illustrating a preferred embodiment of the data reports for the data benchmarking process of the invention.

FIG. 4 is a flow diagram of the method of the present invention 100 showing a preferred method of the data benchmarking 232. Upon accessing the dashboard 120 the user 104 is presented with a plurality of processes 208 as described above. The data benchmarking 232 process comprises a plurality of input elements including, but not limited to, financial losses 284 related to the workers compensation claims and company financial data 292. The preferred input elements of the financial losses 284 are demonstrated in FIG. 6 comprising losses for lost time 285, medical expenses 286 and program expenses 287. The preferred inputs for company financial information 292 comprise revenue 293, payroll 294, man hours 295 and profit margin 296. The data inputs 284 and 292 are stored 152 and analyzed 236 as previously described, including comparisons to national averages and statistics 299 to provide the user 104 with a plurality of data benchmarks reports 240 as shown in FIGS. 7 and 11 including but not limited to average cost per workers compensation claim 301, average indemnity cost per lost time claim 302, average medical cost per lost time claim 303, average expense cost per lost time claim 304, average cost per lost time claim 305, average cost per medical only claim 306, percentage lost time to total 308, losses as percentage of payroll 312, losses as percentage of revenue 316, recordable rate 320, lost work day rate 324, cost per full time equivalent employee 328, sales to pay for accidents 332, projected savings for improvements to national average 336 and projected savings for improvements to company goals 340. An advantage of the data benchmarking process 232 is that new data 300 may be added at any time, or the process may be repeated as improvements are implemented. A further advantage of the data benchmarking 232 is that the plurality of reports 240 enables the workers compensation program manager to identify individual elements and assign independent goals for those elements, not just an overall program bottom line target, thereby providing enhanced flexibility of program management.

The return to work process 264 (also known as the "employee tracker") enables users to enter information about injured employees to gain an understanding of how long their employees are out of work and how effective the company's transitional duty program is performing. The return to work process 264, or 'employee tracker', comprises data inputs regarding the injured employee and the company. Employee personal information is the first type of data that users will enter and is used to generate custom letters to employees. Identifying information comprising name, address and job title, will be pulled from both the user profile and return to work input. It will be used to generate communications such as on-the-fly (real-time) documents with dynamic headers, saving the user time in document creation and modification. The second type of data that must be entered is the detail about the injury comprising the date of the injury, the date that the employee returned to work, and the waiting period (in days). The system then uses the information provided by the user about all injured employees entered into the system to generate a return to work report. In the background the system compiles that information and presents it to the user in an easy-to-read bar graph. The system then groups the employees by the number of days it took for them to return to work. In addition, the report displays the total number of lost days and the total number of injured employees (claims) entered. Users will also have the ability to sort by a specified date range. If the user would like to add additional employee they have the ability to click the 'Add New Episode' button in FIG. 10A and repeat the steps. By doing this the system will re-compile the information and adjust the chart as necessary.

Figure 5:
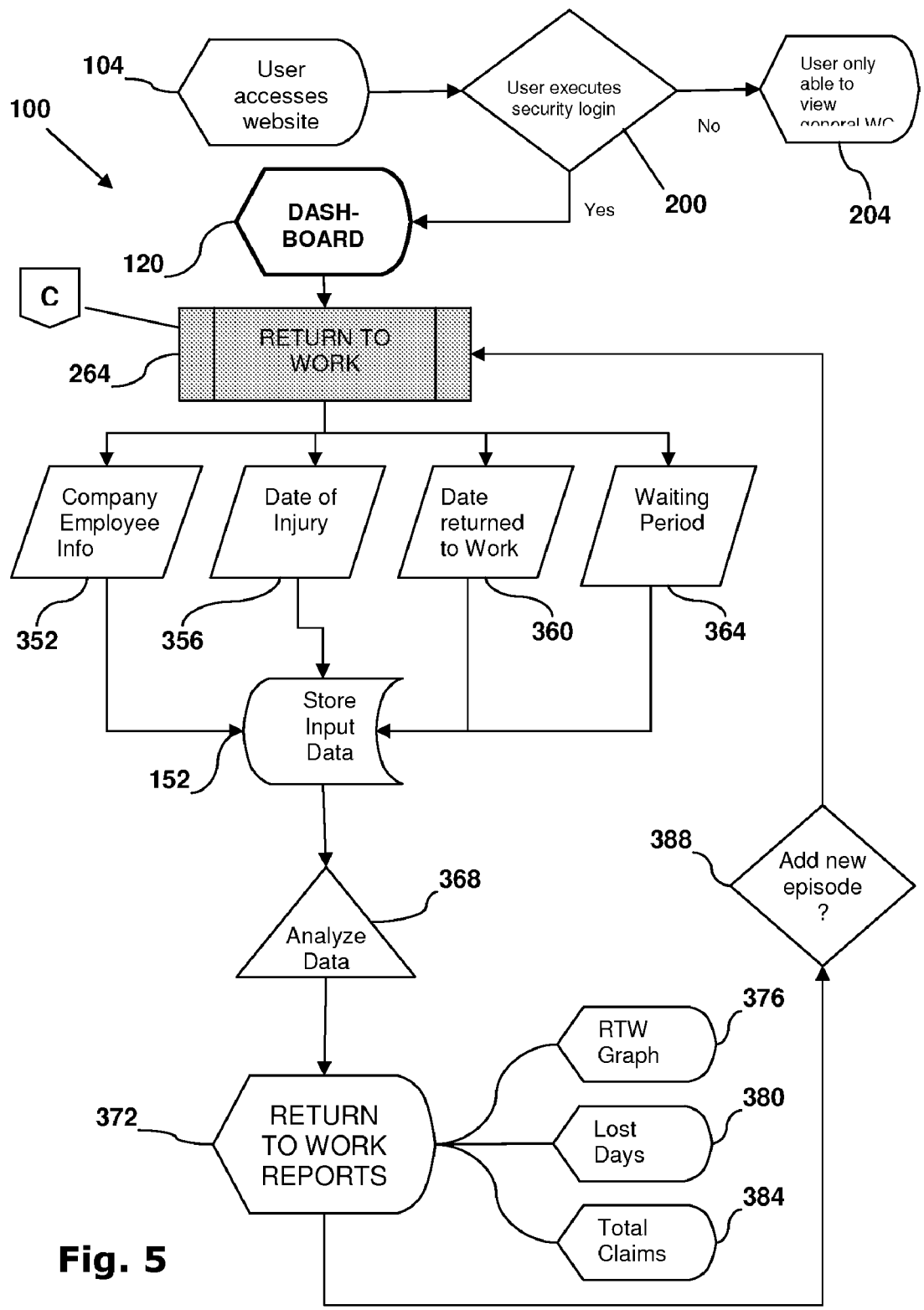
FIG. 5 is a flow diagram illustrating a preferred embodiment of the return to work process of the invention.
Figure 6:
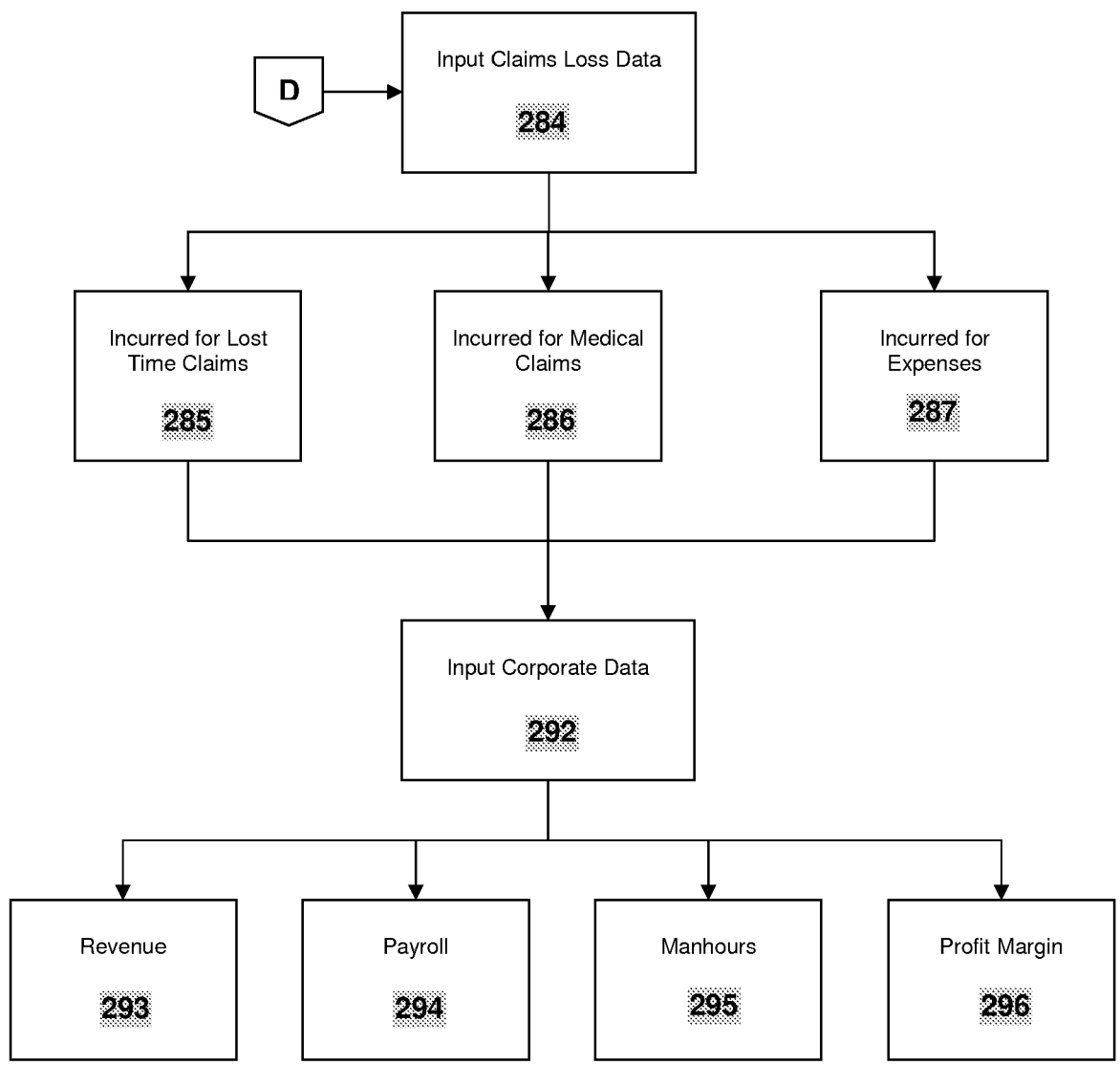
FIG. 6 is a flow diagram illustrating a preferred embodiment of the data inputs for the data benchmarking process of the invention.

FIG. 5 is a flow diagram of the method of the present invention 100 showing a preferred method of the return to work process 264. Upon accessing the dashboard 120 the user 104 is presented with a plurality of processes 208 as described above, including the return to work process 264. The return to work 264 process comprises a plurality of input elements including, but not limited to, employee information 352, date of injury 356, date returned to work 360 and the waiting period 364. The data inputs for return to work 264 are input, stored 152 and analyzed 368 as previously described. The user 104 is provided with a plurality of reports 372 including but not limited to a return to work graph 376, lost days 380, and total claims 384. An advantage of the return to work process 264 is that new return to work data 388 may be added at any time, or the process may be repeated as programs improvements are implemented. A further advantage of the return to work process 264 is that the plurality of reports 372 enables the workers compensation program manager to identify individual elements and assign independent goals for those elements, thereby providing enhanced flexibility of program management.

The next step in the method 100 of the present invention is for users and/or their team to proceed through the improvement plan 244 which preferably comprises ten modules. This will provide the user not only with the information and training to successfully implement a workers' compensation cost containment program, or institute improvements in an existing program, but also with the tools with which to accomplish the tasks.

Referring now to the dashboard 120 display of an embodiment of the improvement plan 244 as shown in FIG. 12, the training improvement plan 244 provides information about preparing to implement the new workers' compensation program. Some key points are stated to identify a team, select a team lead, name the program, and to create a timetable. A plurality of specific documents are available in each module to effect the plan 244. Preferably, the plan 244 comprises the following modules, as illustrated in FIG. 12:

Module 1: Performance Goal—This module allows users to measure their own performance against national benchmarks to indicate success and allows companies to reward those responsible. This module uses data as well as procedural goals. Gathering correct and useful claims data is the basis for development of performance goals. Procedure goals must be set so that claims offices handle claims effectively and meet return to work targets. Locations which need improvement are given additional assistance.

Module 2: Post Injury Response Procedures—This module delineates the important procedures that must be completed following an accident. For example, there must be tight procedures during the 24 hours immediately after an injury so injured employees return to work as soon as medically able. Supervisors must know exactly what to do in the event of an injury. While there are many roadblocks to rapid return to work, most of those can be overcome if they are anticipated in advance and by having proper procedures in place from the moment an injury occurs until an employee returns to work.

Module 3: Communications—This module assists with the development of consistent claims and management procedures including forms and letters to gather information. Conveying the company's message through brochures, wallet cards, and thoughtful gestures ensures that employees understand the required company procedure in the event of an injury. Documentation is based on the role each person plays. Communications with senior management, general managers, supervisors, and employees is based on the use, grade level, language preferences and readability.

Module 4: Return to Work Programs & Procedures—This module details the processes of returning injured employees to work. Once an employee is injured on the job, studies show they must return to work as soon as they are medically able. The longer the time away from the substantial gainful activity of employment the less likely the employee is to return. Sometimes the employee temporarily goes back to work in a less strenuous position than their original job.

Module 5: Management Commitment—This module emphasizes the importance of management commitment in an effective workers compensation program. It is imperative that upper management support changes necessary, such as the recommendations for improvement 272, to reduce workers' compensation costs and maintain productivity. This module will help users learn how to build management commitment and build a plan to get managers on board. Chargebacks and allocation systems motivate all levels of the company to comply with a workers' compensation control process by rewarding success. In addition, this module provides information about available organizational resources, managing claims internally (vs. externally), roles of different departments in the program, and innovative risk management and workers compensation cost containment techniques.

Module 6: Insurance Company and Claims Administrator Performance—This module describes how the insurance arrangement and claims system must be structured to support the company's processes. It is important to build a solid team approach to worker's compensation management, quality control and improvement of the claims handling procedures. Processes are built around the services provided by vendors such as medical clinics, medical providers, nurse case managers, independent medical examination physicians, investigation firms, recovery firms, structured settlement firms, defense attorneys and other services which work to help the user mitigate the cost of their claims.

Module 7: Medical Care Coordination—This module describes how medical care must be coordinated so injured employees receive prompt, quality care by a physician or clinic which supports the company's goal of rapid healing and return to productivity. It's important to know how medical care is selected in the user's state(s) and select the best qualified physicians and clinics to gain maximum control of the medical care employees receive. By including a physician on the team to review medical care and effectiveness of medical vendors is crucial.

Module 8: Medical Cost Containment—This system does not focus on reducing the cost of each medical visit, instead it strives for overall cost reduction which sometimes means paying MORE for a doctor who will spend more time with an injured employee. It's very important to know the cost containment services that the company's Third Party Administrator and insurance company provide in order to utilize the quality control process of this module such as how often services are used, the costs of services such as medical bill review, hospital bill review, utilization review, nurse case management (both telephonic and field-based), negotiated preferred provider networks, and vocational rehabilitation.

Module 9: Fraud, Abuse & Malingering—This module highlights the importance of understanding about fraudulent activities. Some people take advantage of the system by faking injuries or pretending they are injured more seriously than they really are. It is important to be able to spot the red flags of fraud and guide the investigators on the team. Read and review reports, videotapes and photographs. This module allows the user to learn how to coordinate investigation results with medical advisors.

Module 10: Training Initiatives—This module shows that all levels must understand their role and the exact steps they need to make their workers' compensation program successful. As new processes are put into place, each level of the company must know how to use the new forms and must be able to explain the new policies. This new knowledge comes from the training and education provided in the plan 244.

Figure 8:
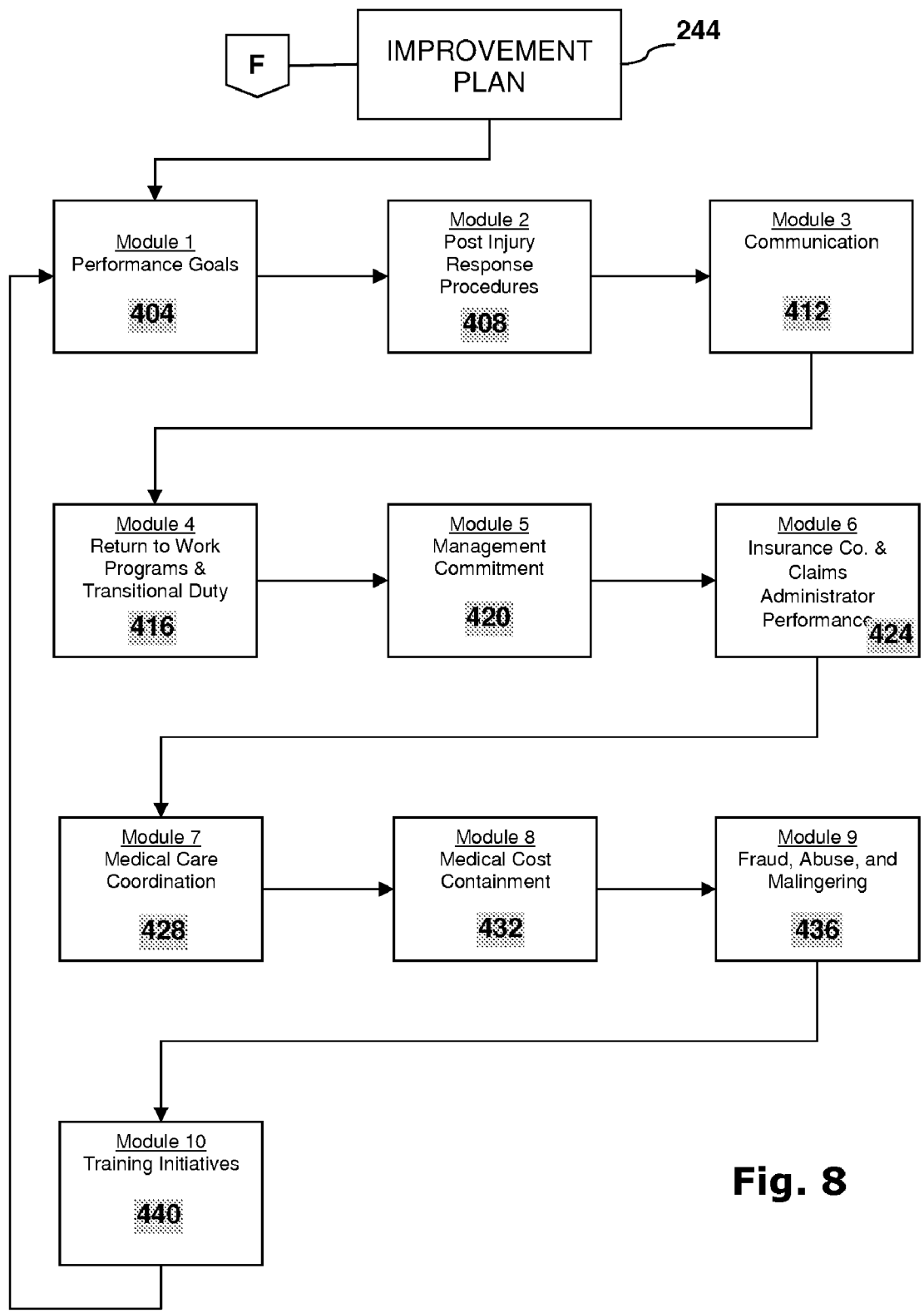
FIG. 8 is a flow diagram illustrating a preferred embodiment of the improvement plan process of the invention.
Figure 10A:
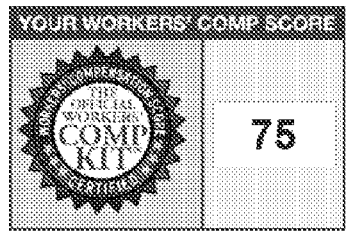

Referring now to FIG. 8, a flow diagram of the method of the present invention 100 showing a preferred method of the improvement plan process 244. Upon accessing the dashboard 120 the user 104 is presented with a plurality of processes 208 as described above, including the improvement plan 244. By utilizing the improvement plan 244 the user 104 has transitioned from the assessment and benchmarking analysis of the workers compensation program to skill training, problem solving, implementing changes and improving the program parameters. The improvement plan 244 comprises a plurality of modules to educate and train the user 104 including, but not limited to, performance goals 404, post injury response procedures 408, communication 412, return to work programs & transitional duty 416, management commitment 420, fraud, abuse and malingering 436, and training initiatives 440. The improvement plan 244 provides templates and forms for implementing the various modules. Preferably the user initiates the training plan 244 at module 1 and proceeds sequentially through the modules to attain the maximum benefit from the plan 244. However, an advantage of the improvement plan 244 is that any module may be utilized independent of the others so that users of any skill level may benefit. The modules may be repeated at any time online as self-paced lessons without the need for hired consultants and classroom time, and the process 244 may be repeated as programs improvements are implemented. In addition, the improvement plan 244 may also be taught in a classroom style, or in a specialized intensive setting know as the workers compensation boot camp. A further advantage of the improvement plan 244 is that it enables the workers compensation program manager to identify modules for training and re-training, thereby providing enhanced flexibility for program management.

Upon completion of the cycle 108 an advantage of the web based system 100 is that the processes can be accessed at any time and the user and/or company can utilize the recommendations and changes identified and by using their own resources they can self-implement and manage a workers' compensation cost containment program.

It is understood that the embodiments and descriptions of the invention herein described are merely instruments of the application of the invention and those skilled in the art should realize that changes may be made without departure from the essential elements and contributions to the art made by the teachings of the invention herein.

What is claimed is:

1. A method of reducing the cost of an employer's workers' compensation program and improving claims management methods comprising the steps of:
  a. assessing the efficiency of the best practices of an employer comprising the steps of:
   i. inputting responses into a questionnaire for workplace management and workers' compensation program practices comprising a plurality of company procedures and cost drivers that reflect company best practices and procedures recognized in industry as being necessary to reduce workers' compensation costs and identify strengths and weaknesses in workplace management practices, into the memory of a computer;
   ii. analyzing the responses in the memory of the computer using a computer program stored in the memory of a computer;
   iii. producing a workers' compensation score wherein the higher the score the smaller the implementation of best practices and the lower the score the more best practices must be implemented;
   iv. producing a percentile ranking of a user compared to other users who have produced a workers' compensation score;

v. producing a workers' compensation score tracker;
vi. producing a best practices profile ranking in a plurality of operating units or companies; and
vii. producing a report of employer-specific customized best practice recommendations for improvement comprising an action plan useable by the company to implement changes in workplace workers' compensation management best practices;
b. comparing the efficiency of the implementation by the employer of said best practice recommendations from said action plan to national standards by data benchmarking comprising the steps of:
   i. inputting data characterizing an employer's workers' compensation management practices, comprising,
      (a) the company name;
      (b) the policy period;
      (c) the valuation date;
      (d) the number and cost of existing workers' compensation claims;
      (e) number of and incurred amount for lost time claims;
      (f) number of and incurred amount for medical claims;
      (g) incurred amount for expenses;
      (h) corporate data comprising total revenue;
      (i) total payroll;
      (j) total number of manhours worked; and
      (k) profit margin and days lost;
   ii. analyzing the data in the memory of the computer using a computer program stored in the memory of a computer to produce reports providing calculated values as dollar values, percentages or rates, said reports comprising,
      (a) average cost per workers compensation claim;
      (b) average indemnity cost per lost time claim;
      (c) average medical cost per lost time claim;
      (d) average expense cost per lost time claim;
      (e) average cost per lost time claim;
      (f) average cost per medical only claim;
      (g) percentage lost time claims to total;
      (h) average losses as a percentage of payroll;
      (i) average losses as a percentage of revenue;
      (j) recordable rate;
      (k) lost work day rate; and
      (l) average cost per full time equivalent employee;
   iii. comparing said values to national cost averages and statistics relevant to management and quality control of workers' compensation management practices;
c. comparing the efficiency of the implementation by the employer of said best practice recommendations from said action plan in returning injured employees to work, comprising the steps of,
   i. inputting return to work employee injury data into the memory of a computer, said data comprising,
      (a) employee information;
      (b) date of injury;
      (c) date returned to work; and
      (d) the waiting period;
   ii. analyzing said data in the memory of the computer using a computer program stored in the memory of a computer to produce reports comprising,
      (a) return to work graph;
      (b) lost days; and
      (c) total claims;
   iii. identifying individual return to work elements for improvement and assigning goals for said elements;
d. providing an online improvement training process for implementing recommended best practices in said action plan;
e. training users by said improvement process;
f. implementing said best practice recommendations from said action plan;
g. comparing the best practices implementation over time by periodically repeating steps (a)-(f) and inputting said scores on said score tracker;
h. revising said action plan in response to score trends, and
i. inputting data characterizing new workers' compensation claims to the computer after implementing the employer-specific recommendations.

2. The method of claim 1 wherein the computer program for analyzing the responses and data is stored in the memory of a different computer than the computer in which the data is stored.

3. The method of claim 2 wherein the computer in which the computer program for analyzing the responses and data is stored accesses the computer in which the data is stored via Internet, Intranet, or other network connection.

4. The method of claim 2 wherein the computer in which the responses and data are stored accesses the computer in which the computer program for analyzing the responses and data is stored via Internet, Intranet, or other network connection.

5. The method of claim 4 wherein access to the computer in which the computer program for analyzing the responses and data is stored is secure.

6. The method of claim 4 wherein the employer is provided with a unique account identifier and accesses the computer in which the computer program for analyzing the responses and data is stored via an Internet portal that is customized for the account.

* * * * *